（12）United States Patent
Hayashi et al.

(10) Patent No.: US 8,779,332 B2
(45) Date of Patent: Jul. 15, 2014

(54) METHOD FOR MANUFACTURING HONEYCOMB STRUCTURE FORMING DIE

(75) Inventors: Seiichiro Hayashi, Nagoya (JP); Tomoki Nagae, Nagoya (JP); Masanari Iwade, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 204 days.

(21) Appl. No.: 13/049,180

(22) Filed: Mar. 16, 2011

(65) Prior Publication Data

US 2011/0233186 A1    Sep. 29, 2011

(30) Foreign Application Priority Data

Mar. 23, 2010  (JP) ................................. 2010-065879

(51) Int. Cl.
*H05B 7/18*  (2006.01)
(52) U.S. Cl.
USPC ........................................................ 219/383
(58) Field of Classification Search
USPC .............. 219/69.2, 69.14, 69.15, 69.17, 383; 29/890; 425/461, 462, 464, 467; 205/648, 664, 665
See application file for complete search history.

(56) References Cited

U.S. PATENT DOCUMENTS

| 6,570,119 | B2 | 5/2003 | Marcher |
| 7,335,848 | B2 | 2/2008 | Hironaga et al. |
| 8,244,497 | B2 * | 8/2012 | Folmar et al. ................. 702/170 |
| 2005/0076627 | A1 | 4/2005 | Itou et al. |

FOREIGN PATENT DOCUMENTS

| EP | 1452702 | * | 1/2004 |
| JP | 63-028522 A1 | | 2/1988 |
| JP | 63-028523 A1 | | 2/1988 |
| JP | S63-28520 | | 2/1988 |
| JP | 2002-172527 A1 | | 6/2002 |
| JP | 2002-273626 A1 | | 9/2002 |
| JP | 2003-071638 A1 | | 3/2003 |
| JP | 2004-000896 A1 | | 1/2004 |
| JP | 2005-254345 A1 | | 9/2005 |

OTHER PUBLICATIONS

Japanese Office Action dated Jan. 24, 2012.
Extended European Search Report, European Patent Application No. 11250322.2, dated Dec. 17, 2013 (7 pages).

* cited by examiner

*Primary Examiner* — Dana Ross
*Assistant Examiner* — Joseph Iskra
(74) *Attorney, Agent, or Firm* — Burr & Brown, PLLC

(57) ABSTRACT

There is provided a method for manufacturing a honeycomb structure forming die, the method includes: an introduction hole forming step for forming, in plate-shaped die substrate having one side end face and the other side end face, a plurality of introduction holes for introducing kneaded clay on the other side end face to function as a kneaded clay introduction face, and a slit forming step for forming slits communicating with the introduction holes in order to form the partition walls of the honeycomb structure by extruding the kneaded clay by performing a comb-like electro-discharge machining by a comb-like electrode 21 where a plurality of plate-shaped protrusion electrodes 23 corresponding with width of the slits are disposed on the one side end face to function as a kneaded clay formation face of the die substrate.

5 Claims, 9 Drawing Sheets

METHOD FOR MANUFACTURING HONEYCOMB STRUCTURE FORMING DIE

BACKGROUND OF THE INVENTION AND RELATED ART STATEMENT

The present invention relates to a method for manufacturing a honeycomb structure forming die for extrusion-forming a honeycomb structure having cells having different sizes.

There is increasing the need for removing particulate matter and harmful substances in exhaust gas from internal combustion engines, boilers, and the like in consideration of influences to an environment. In particular, regulations regarding the removal of Particulate matter (hereinbelow sometimes referred to as "PM") discharged from diesel engines tend to be strengthened on a global basis, and the use of a honeycomb filter is attracting attention as a trapping filter (hereinbelow sometimes referred to as "DPF") for removing PM. Therefore, various systems have been proposed. In the aforementioned DPF generally has a structure where a plurality of cells having a cross sectional shape of a quadrangle, hexagon, or the like and functioning as fluid passages are formed by porous partition walls and where the porous partition walls constituting the cells play a role of a filter. Here, the "cross sectional shape" means the shape of a cross section taken along a plane perpendicular to the longitudinal direction of the cells.

In the DPF, a target fluid to be treated, which contains particulate matter, is allowed to flow in the DPF from one side end portion, and, after the particulate matter is filtrated by the partition walls, purified gas is discharged from the other side end portion. There is a problem that, as the exhaust gas flows in the DPF, the particulate matter contained in the exhaust gas deposits in the one side end portion (exhaust gas inflow side end portion) to clog a cell. This is prone to be caused in the case that a large amount of particulate matter is contained in the exhaust gas or in a cold district. When a cell is thus clogged, there arises a problem that the pressure loss in the DPF is rapidly increased. In order to suppress such clogging of a cell, there has been proposed a structure (HAC (High Ash Capacity) structure) where the cross-sectional area of the cells (inflow side cells) open in the end portion on the exhaust gas inflow side is different from that of the cells (outflow side cells) open in the other side end portion (end portion on the exhaust gas outflow side) (see, e.g., JP-A-2004-896). Here, the cross-sectional area means the area of a cross section taken along a plane perpendicular to the longitudinal direction of the cell. By increasing the size (area) of the cell opening portion (cell cross section) of the inflow side cells than that of the outflow side cells, the surface area of the inflow side cell surface where particulate matter and the like deposit becomes large, which enables to suppress the increase of pressure loss.

As a method for manufacturing a ceramic honeycomb structure, there has conventionally been known a method using a honeycomb structure forming die (hereinbelow sometimes referred to as a "die") provided with back holes (hereinbelow sometimes referred to as an "introduction holes") for introducing a forming raw material (hereinbelow sometimes referred to as "kneaded clay") and a die substrate where slits having a hexagonal shape or the like and communicating with the back holes are formed. The forming raw material such as a ceramic raw material introduced in the die from the back holes moves to the slits having narrow width from the back holes having relatively large inner diameter and is extruded as a formed article having a honeycomb structure (honeycomb formed article) from the opening portions of the slits.

As a method for manufacturing such a honeycomb structure forming die, there has been known a grinding method in the case of quadrangular cells. In addition, as a method for manufacturing a hexagonal cell honeycomb structure forming die, for example, there is disclosed a manufacturing method where the aforementioned honeycomb-shaped slits are formed by electro-discharge machining (EDM) (see, e.g., Japanese Patent No. 1784822, Japanese Patent No. 1784823, and JP-A-2002-273626).

However, in a honeycomb structure having different cell sizes between the target fluid inflow side and the outflow side, since cells having different cell sizes are aligned, the partition walls are not linearly formed. Therefore, the slits for forming partition walls of the honeycomb structure in the honeycomb structure forming die for extrusion-forming a forming raw material are disposed not linearly but in a concavo-convex shape. Therefore, it is impossible to form the slits in the honeycomb structure forming die having such a structure by grinding as in the die for extrusion-forming a honeycomb structure of quadrangular cells.

Therefore, in order to form slits corresponding with the cell structure having different cell sizes between the target fluid inflow side and the outflow side, a die has been manufactured by electro-discharge machining using an electrode having a mesh shape which is like a transcription of a cell structure of the slits. However, since many steps are required for manufacturing a mesh-shaped electrode and a DPF has a large diameter, time of several months to half year is required for manufacturing an electrode for manufacturing a die. Therefore, there has been demanded a method for more easily manufacturing a die for extrusion-forming a honeycomb structure having different cell sizes between the target fluid inflow side and the outflow side.

SUMMARY OF THE INVENTION

The present invention aims to provide a method for manufacturing a honeycomb structure forming die, the method enables to more easily manufacture a die for extrusion-forming a honeycomb structure having cells having different sizes.

The present inventors found out that the aforementioned problems can be solved by electro-discharge machining using a comb-like electrode. That is, according to the present invention, there is provided the following method for manufacturing a honeycomb structure forming die.

[1] A method for manufacturing a honeycomb structure forming die for subjecting kneaded clay as a raw material to extrusion forming in order to manufacture a honeycomb structure provided with porous partition walls separating and forming a plurality of cells functioning as fluid passages and having first cells having a predetermined opening area and second cells having a different opening area from that of the first cells disposed alternately, wherein the method comprises: an introduction hole forming step for forming, in plate-shaped die substrate having one side end face and the other side end face, a plurality of introduction holes for introducing kneaded clay on the other side end face to function as a kneaded clay introduction face, and a slit forming step for forming slits communicating with the introduction holes in order to form the partition walls of the honeycomb structure by extruding the kneaded clay by performing a comb-like electro-discharge machining with a comb-like electrode where a plurality of plate-shaped protrusion electrodes corresponding with width of the slits are disposed on the one side end face to function as a kneaded clay formation face of the die substrate.

[2] The method for manufacturing a honeycomb structure forming die according to [1], which has a liquid hole forming step for forming processing liquid holes having an opening diameter smaller than the width of the slits in positions where the slits are formed so that the introduction holes communicate with the one side end face before or after the introduction hole forming step, and where the slit forming step is performed with allowing the processing liquid to circulate in the processing liquid holes after the introduction hole forming step and the liquid hole forming step.

[3] The method for manufacturing a honeycomb structure forming die according to [1] or [2], wherein, after predetermined slits are formed by the comb-like electrode, the comb-like electrode is rotated to form next predetermined slits in the slit forming step.

[4] The method for manufacturing a honeycomb structure forming die according to any one of claims 1 to 3, wherein two or more kinds of comb-like electrodes are used in the slit forming step.

A comb-like electrode having protrusion electrodes disposed thereon and being used in a method for manufacturing a honeycomb structure forming die of the present invention can easily be manufactured. Therefore, a manufacturing method of the present invention where a comb-like discharge machining using a comb-like electrode is performed enables to more easily manufacture a die for extrusion-forming a honeycomb structure having cells having different sizes.

REFERENCE NUMERALS

Figure 1:
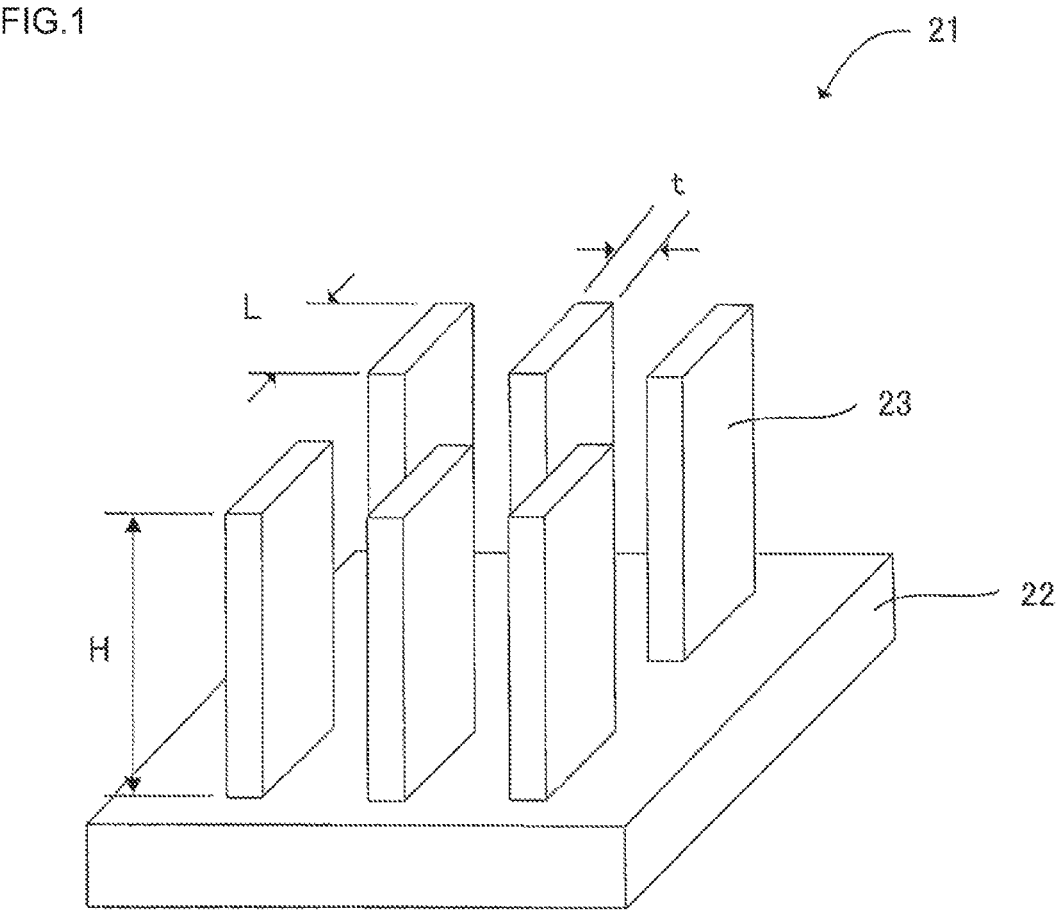
FIG. 1 is a perspective view schematically showing a part of a comb-like electrode.

1: honeycomb structure forming die, 2: die substrate, 3: processing liquid hole, 4: introduction hole, 5: slit, 5a: slit to be formed, 5b: slit which has been formed, 7: one side end face, 8: the other side end face, 10: processing liquid, 17: kneaded clay formation face, 18: kneaded clay introduction face, 21: comb-like electrode, 22: comb-like electrode support portion, 23: protrusion electrode, 40: honeycomb structure, 41: partition wall, 42: cell

DETAILED DESCRIPTION OF THE INVENTION

Hereinbelow, an embodiment of the present invention will be described with referring to drawings. The present invention is by no means limited to the following embodiment, and changes, modifications, and improvements may be made as long as they do not deviate from the scope of the present invention.

A method for manufacturing a honeycomb structure forming die (hereinbelow sometimes referred to simply as a die 1) of the present invention is a method for manufacturing a honeycomb structure forming die for subjecting kneaded clay as a raw material to extrusion forming in order to manufacture (form) a honeycomb structure 40 (see FIG. 7) provided with porous partition walls 41 separating and forming a plurality of cells 42 functioning as fluid passages and having first cells having a predetermined opening area and second cells having a different opening area from that of the first cells disposed alternately. The honeycomb structure 40 manufactured by a die 1 manufactured by a method for manufacturing a honeycomb structure forming die of the present invention can be used as, for example, a honeycomb filter where the first cells are open on the one side end portions and plugged on the other side end portions and the second cells are plugged on the one side end portions and open on the other side end portions to allow the fluid flowing in from the one side end portions where the first cells are open to pass through the partition walls 41, to be discharged into the second cells as a permeated fluid, and to be discharged from the other side end portions where the second cells are open.

A method for manufacturing a honeycomb structure forming die of the present invention has an introduction hole forming step for forming, in plate-shaped die substrate 2 having one side end face 7 and the other side end face 8, a plurality of introduction holes 4 for introducing kneaded clay on the other side end face 8 to function as a kneaded clay introduction face 18, and a slit forming step for forming slits 5 communicating with the introduction holes 4 in order to form the partition walls 41 of the honeycomb structure by extruding the kneaded clay by performing comb-like electro-discharge machining by a comb-like electrode 21 (see FIG. 1) where a plurality of plate-shaped protrusion electrodes 23 corresponding with width of the slits 5 are disposed on the one side end face 7 to function as a kneaded clay formation face 17 of the die substrate 2.

In the die 1 for forming a honeycomb structure having cells 42 having different sizes, since the slits 5 for forming partition walls 41 are not linear, a mesh electrode has conventionally been used, and manufacturing of the electrode took time, which caused rise in costs. A manufacturing method of the present invention is a method using a comb-like electrode 21 as shown in FIG. 1. In the comb-like electrode 21, a plurality of plate-shaped protrusion electrodes 23 corresponding with groove width of the die 1 are disposed on the plate-shaped comb-like electrode support portion 22. Since the comb-like electrode 21 can be worked not by discharge, but by cutting or grinding, time spent for manufacturing can be reduced, and the production costs can be reduced. In addition, in a conventional mesh electrode, since it is difficult to manufacture an electrode with high accuracy, the accuracy in slit width of the die is low. However, the comb-like electrode 21 used for a manufacturing method of the present invention has a simple structure, and working with high accuracy is possible. That is, since the comb-like electrode 21 enables to manufacture a die with high accuracy in a short period of time, a manufacturing method of the present invention using the comb-like electrode 21 enables to reduce production costs.

It is preferable that a method for manufacturing a honeycomb structure forming die of the present invention has a liquid hole forming step for forming processing liquid holes 3 having an opening diameter smaller than the width of the slits 5 in positions where the slits 5 are formed so that the introduction holes 4 communicate with the one side end face 7 before or after the introduction hole forming step and that the slit forming step is performed with allowing the processing liquid 10 to circulate in the processing liquid holes 3 after the introduction hole forming step and the liquid hole forming step.

By performing the slit forming step with allowing the processing liquid to circulate in the processing liquid holes 3, it is possible to discharge sludge generated by the electro-discharge machining on the surface side of the die substrate 2, normal electro-discharge machining can be realized by causing stable discharge by a comb-like electrode 21, and a honeycomb structure forming die can be manufactured with high precision.

In a method for manufacturing a honeycomb structure forming die, after predetermined slits 5 are formed by a comb-like electrode 21 in the slit forming step, the comb-like electrode 21 is rotated on the one side end face 7 to form the next predetermined slits 5. In the honeycomb structure 40 having cells 42 having different sizes, neither the partition walls 41 nor the slits 5 of the die 1 for forming is linear. Therefore, by forming the slits 5 with rotating the comb-like electrode 21, the slits which are not linear of the die 1 can be formed.

In a method for manufacturing a honeycomb structure forming die, two or more kinds of comb-like electrodes 21 are used in the slit forming step. In order to manufacture the die 1 for forming a honeycomb structure 42 having cells 42 having different sizes, it is necessary to use two or more kinds of comb-like electrodes 21.

The embodiment of the present invention will be described in more detail. In the first place, the material for constituting the die substrate 2 of the honeycomb structure forming die 1 will be described.

(Material Constituting Die Substrate)

As the material for constituting the die substrate 2 to be used in the present embodiment, metal or alloy generally used as a material for a honeycomb structure forming die may be employed. For example, there may be employed a metal or an alloy containing at least one metal selected from the group consisting of iron (Fe), titanium (Ti), nickel (Ni), copper (Cu), and aluminum (Al). Incidentally, it is more preferable that the metal or alloy constituting the first plate-shaped member 23 contains additives such as carbon (C), silicon (Si), chrome (Cr), manganese (Mn), molybdenum (Mo), platinum (Pt), and palladium (Pd).

As another suitable example of the alloy constituting the die substrate 2, there may be employed stainless steel alloy, more specifically, SUS630 (C: 0.07 or less, Si: 1.00 or less, Mn: 1.00 or less, P: 0.40 or less, S: 0.030 or less, Ni: 3.00 to 5.00, Cr: 15.50 to 17.50, Cu: 3.00 to 5.00, Nb+Ta: 0.15 to 0.45, Fe: the rest (the unit is mass %)). Such stainless steel alloy can be worked relatively easily and is inexpensive.

In addition, as another example of the alloy for constituting the die substrate 2, it is preferable to use an alloy constituted of a tungsten carbide group superhard alloy excellent in abrasion resistance. This enables to manufacture a honeycomb structure forming die 1 where abrasion of the slits 5 is effectively inhibited.

The aforementioned tungsten carbide group superhard alloy is an alloy containing at least tungsten carbide and is preferably an alloy obtained by sintering tungsten carbide with at least one metal selected from the group consisting of iron (Fe), cobalt (Co), nickel (Ni), titanium (Ti), and chrome (Cr). A tungsten carbide group superhard alloy using at least one metal selected from the aforementioned group as a bonding material is particularly excellent in abrasion resistance and mechanical strength. A specific example is a tungsten carbide group superhard alloy using cobalt (Co) as the bonding material at a WC—Co ratio of 0.1 to 50 mass %.

By employing a plate-shaped member of the aforementioned material as the die substrate 2, a honeycomb structure forming die 1 can be manufactured by the following steps.

(Introduction Hole Forming Method)

Figure 2A:
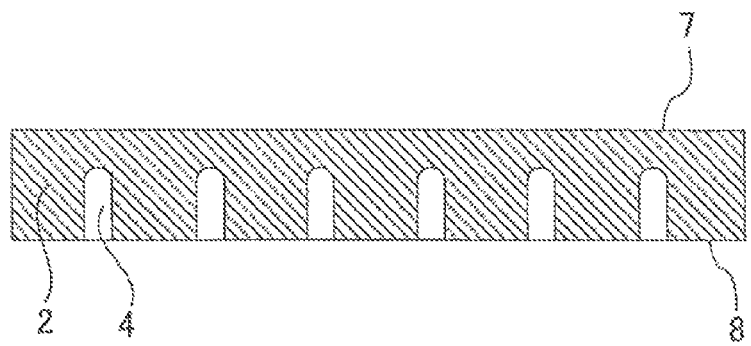
FIG. 2A is a cross-sectional view of a die substrate where introduction holes are formed.
Figure 2B:
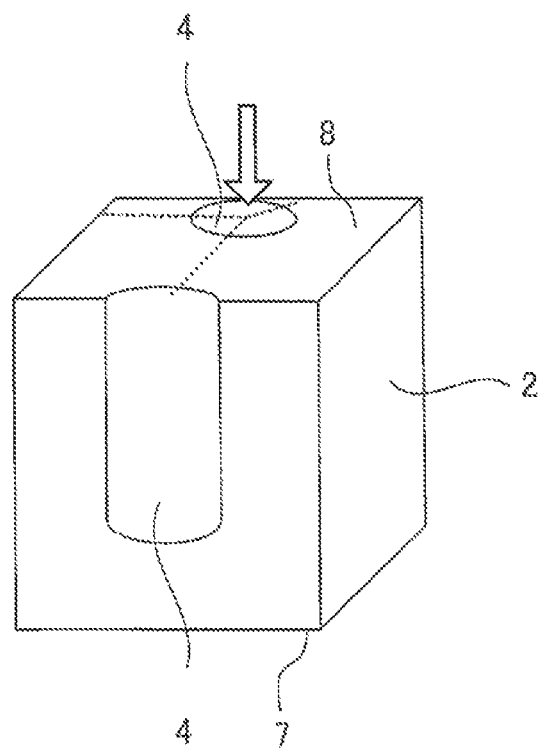
FIG. 2B is a partial cross-sectional perspective view of a die substrate where introduction holes are formed.
Figure 2C:
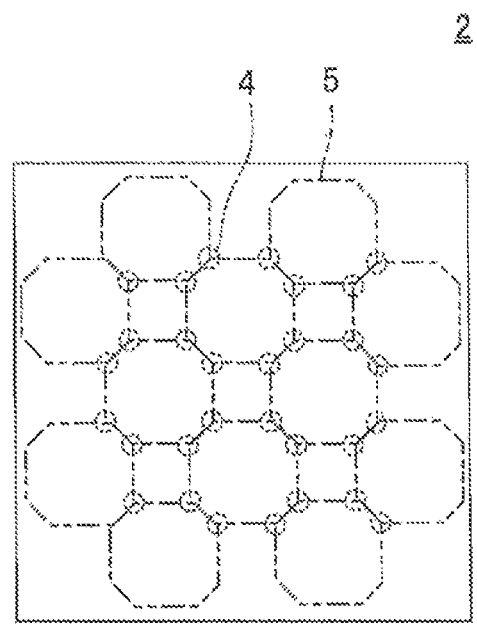
FIG. 2C is a schematic view of a die substrate from the one side end face in order to explain slit formation positions and introduction hole formation positions.

In the first place, as shown in FIGS. 2A and 2B, introduction holes 4 open in the thickness direction in the other side end face 8 to function as a kneaded clay introduction face 18 of the die substrate 2 are formed. In addition, upon forming the introduction holes 4 in the die substrate 2, as shown in FIG. 2C, it is preferable to form the holes 4 in positions where the holes 4 communicate with the intersection portions in the honeycomb-shaped slits 5 of the honeycomb structure forming die 1. By forming the introduction holes 4 in such positions, upon the extrusion forming using the honeycomb structure forming die 1, the forming raw material introduced into the introduction holes 4 can be spread uniformly in the entire slits 5 to be able to realize high moldability.

The size of the opening diameter of the introduction holes 4 can be determined appropriately according to the shape (thickness and interval of partition walls) and the like of the honeycomb structure (see FIG. 7) to be extrusion-formed. There is no particular limitation on the method for forming such introduction holes 4, and a conventionally known method by electrochemical machining (ECM), electro-discharge machining (EDM), laser machining, or mechanical working such as drilling can suitably be employed.

(Liquid Hole Forming Step)

Figure 3A:
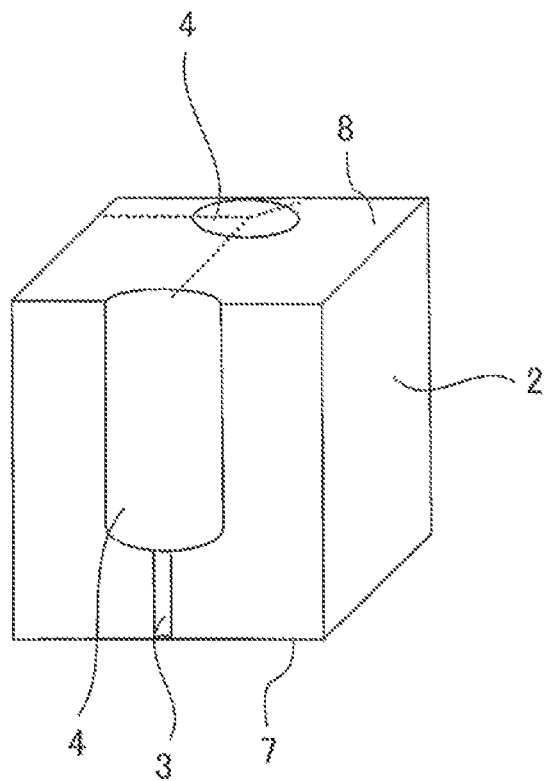
FIG. 3A is a partial cross-sectional perspective view of a die substrate where processing liquid holes are formed.

As shown in FIG. 3A, processing liquid holes 3 having an opening diameter smaller than the width of the slits 5 are formed so that the one side end face 7 may communicate with the introduction holes 4 in positions where the slits are formed 5 after the introduction hole forming step (alternatively, before the introduction hole forming step).

(Slit Forming Step)

The slits 5 formed in the slit forming step are honeycomb-shaped slits 5 for extrusion-forming the honeycomb structure 40 having cells 42 having different sizes. The width of the slits 5 is, for example, 0.05 to 1.00 mm. The depth of the slits 5 from the kneaded clay formation face 17 is for example 0.50 to 5.00 mm.

(Comb-Like Electrode)

In the slit forming step, comb-like electro-discharge machining is performed plural times on the kneaded clay formation face 17 by the use of a comb-like electrode 21 as shown in FIG. 1 where parallelly-arranged plate-shaped protrusion electrodes 23 corresponding with one side of the slit 5 are arranged in parallel on the protrusion electrode support portion 22.

In the protrusion electrodes 23 provided on the comb-like electrode 21, the thickness t is allowed to correspond with the width of the slits 5 and is, for example, 0.020 to 0.800 mm. In addition, the height H of the protrusion electrodes 23 is larger than the depth of the slits 5 and is, for example, 1.00 to 8.00 mm. In addition, the width L of the protrusion electrode 23 is, for example, 0.40 to 2.00 mm.

Incidentally, when the slits 5 are deep, it is preferable to perform machining by the comb-like electrode 21 plural times. The reason is because the slits may have a tapered shape where the slit width becomes narrower as the slits 5 become deeper due to wastage of the electrode. In order to widen the slits in the deep portion, it is preferable that, after comb-like electro-discharge machining is performed, the comb-like electrode 21 is replaced by a new one to perform electro-discharge machining with the new comb-like electrode 21 plural times. In addition, it is preferable to use the protrusion electrodes 23 whose thickness t is reduced in the repeated comb-like electro-discharge machining because only the deep portions of the slits 5 having a tapered slit width can be machined without being machined in the portions near the upper face of the machining face.

(Material Constituting Comb-Like Electrode)

Though there is no particular limitation on the material constituting the comb-like electrode 21 used in the present embodiment, a carbon graphite microparticle material having high strength and high density can be employed. More specifically, a preferable example has an average particle diameter of 5 μm or less. A carbon electrode of such a carbon graphite material has the advantages of being able to form an article having a minute shape such as the protrusion electrodes 23 of the comb-like electrode 21, having high hardness and excellent abrasion resistance, and having high machining speed. However, since it is prone to be damaged because of high hardness, when a carbon graphite microparticle material having high strength and high density is used as a material constituting the comb-like electrode 21, it is particularly preferable to efficiently remove sludge generated during the electro-discharge machining by a processing liquid or the like.

Figure 3B:
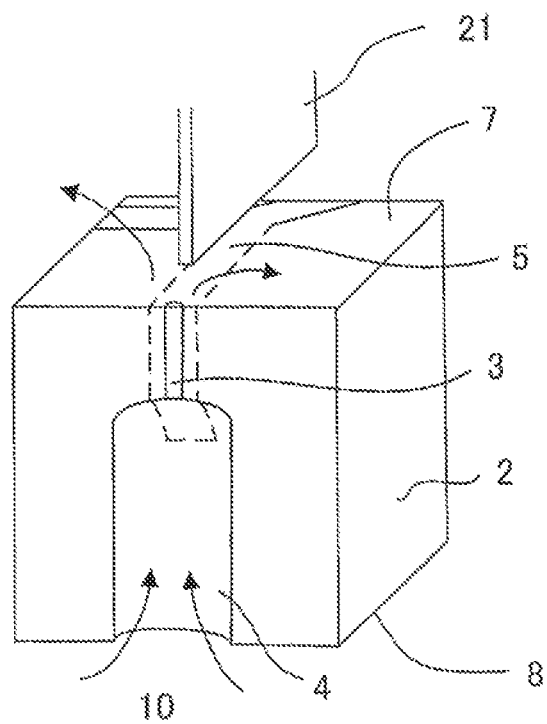
FIG. 3B is a partial cross-sectional perspective view of a die substrate showing a step of forming a slit.

The slit forming step will be described by the use of FIGS. 4A to 4F. As shown in FIG. 3B, in the slit forming step, it is preferable to perr r form machining by the use of the comb-like electrode 21 with allowing the processing liquid 10 to circulate in the processing liquid holes 3. FIGS. 4A to 4F are schematic views from the side of slit 5 formation (one side end face 7, kneaded clay formation face 17) to show portions (slit 5a) where slits 5 are to be formed and slits 5 (slits 5b) already formed in the prior steps. The disposition of the slits 5a to be formed is the same as that of the protrusion electrodes 23 of the comb-like electrode 21. Two or more kinds of comb-like electrodes 21 are used and rotated as necessary on the kneaded clay formation face 17 to machine the die substrate 2.

Figure 4A:
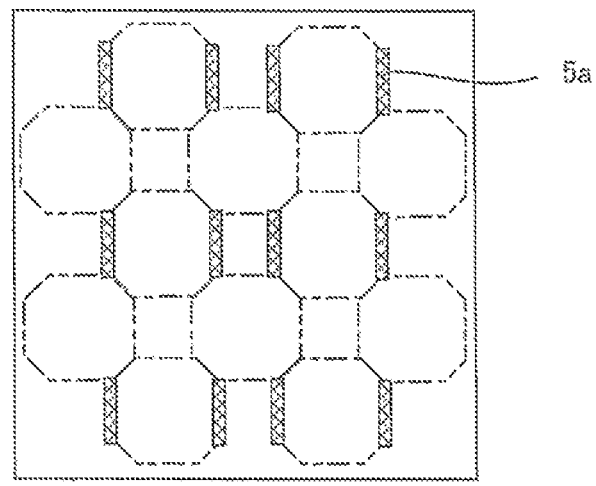
FIG. 4A is a schematic view for explaining the first step of electro-discharge machining by a comb-like electrode.
Figure 4B:
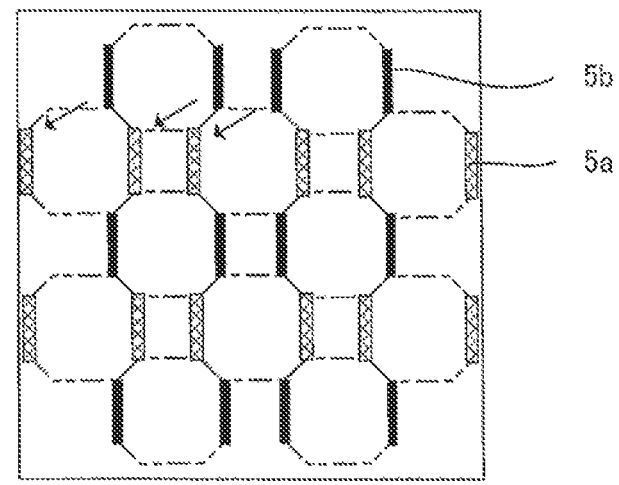
FIG. 4B is a schematic view for explaining the second step of electro-discharge machining by a comb-like electrode.

As shown in FIG. 4A, the slits 5a are formed by machining of the first step with the first comb-like electrode 21. The disposition of the slits 5a is the same as that of the protrusion electrodes 23 of the comb-like electrode 21. Subsequently, as shown in FIG. 4B, the first comb-like electrode 21 is parallelly-moved, and the second step is performed to form slits 5a in different lines (In FIG. 4B, the slits 5a formed in the first step of FIG. 4A are shown as the slits 5b).

Figure 4C:
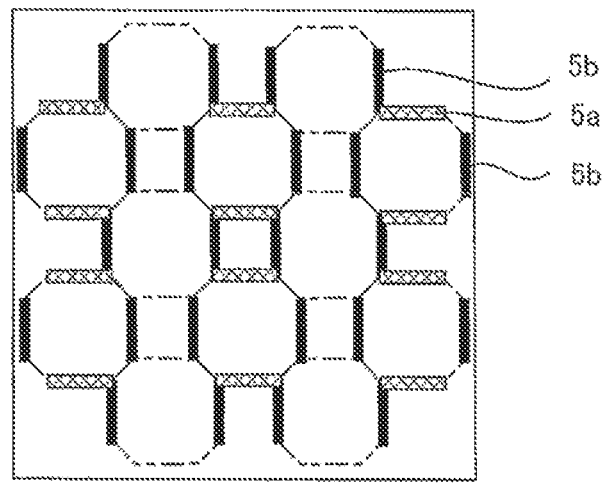
FIG. 4C is a schematic view for explaining the third step of electro-discharge machining by a comb-like electrode.

Subsequently, as shown in FIG. 4C, in the third step, the first comb-like electrode 21 is rotated by 90 degrees in the one side end face 7 (kneaded clay formation face 17) to form the slits 5a by machining slit lines perpendicular to the slit lines formed in the first and second steps (In FIG. 4C, the slits 5a formed in the first and second steps are shown as the slits 5b).

Figure 4D:
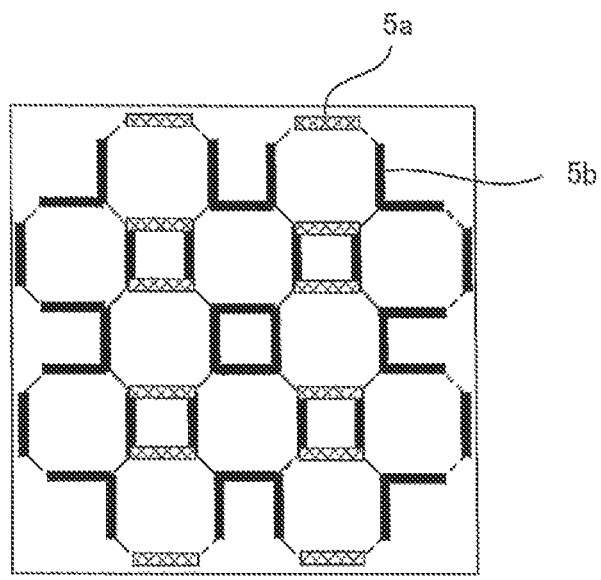
FIG. 4D is a schematic view for explaining the fourth step of electro-discharge machining by a comb-like electrode.

Further, as shown in FIG. 4D, in the fourth step, the first comb-like electrode 21 is parallelly-moved, and machining is performed to form slits 5a in different lines.

Figure 4E:
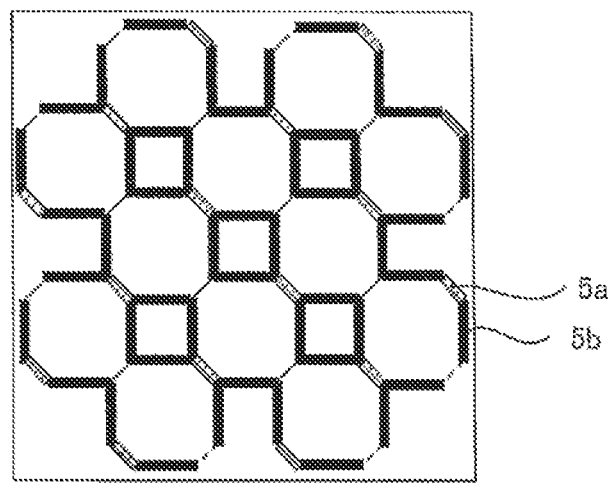
FIG. 4E is a schematic view for explaining the fifth step of electro-discharge machining by a comb-like electrode.
Figure 4F:
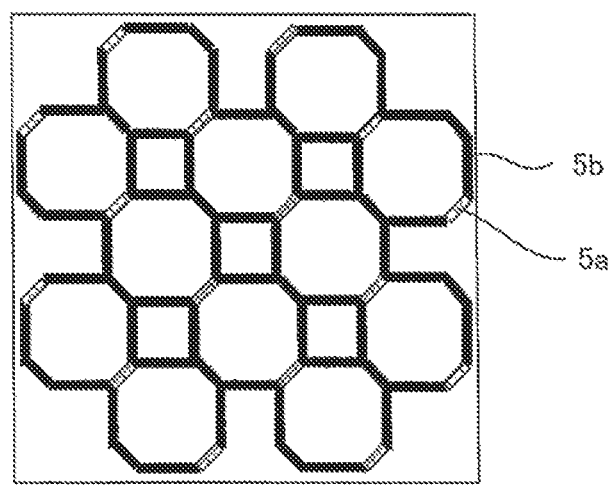
FIG. 4F is a schematic view for explaining the sixth step of electro-discharge machining by a comb-like electrode.

Next, as shown in FIG. 4E, in the fifth step, the second comb-like electrode 21 is used for machining, and, in the sixth step, as shown in FIG. 4F, the second comb-like electrode 21 is rotated to form slits 5a.

In the case of thus using two kinds of electrodes, the number of electrodes to be prepared can be small, and time and costs for manufacturing the electrodes can be reduced. In addition, since change of the electrodes is required only twice, the number of setup steps such as positioning can be reduced. Further, any type can be machined as long as the cells have a HAC shape.

Alternatively, in the fifth step shown in FIG. 4E, it is also possible to perform machining by the first comb-like electrode 21 by rotating the first comb-like electrode 21 by 45 degrees from the fourth step. In this case, it is possible to perform machining in the sixth step shown in FIG. 4F by rotating the first comb-like electrode 21 by 90 degrees. In the case of thus using one kind of electrode, the number of electrodes to be prepared can be small, and time and costs for manufacturing the electrodes can be reduced. In addition, since change of the electrodes is required only once, the number of setup steps such as positioning can be reduced.

Figure 5A:
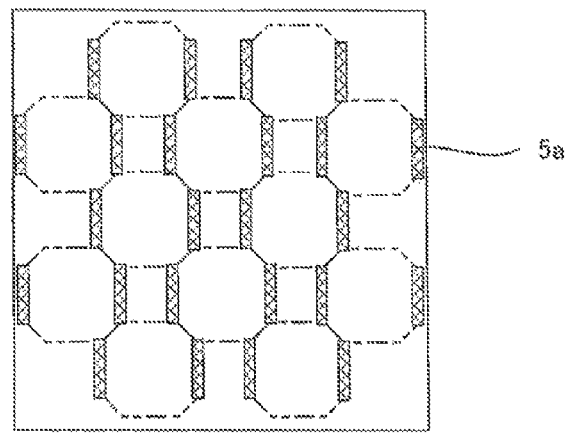
FIG. 5A is a schematic view for explaining a step of the electro-discharge machining by a comb-like electrode in another embodiment.

Incidentally, by allowing the first comb-like electrode 21 to have the protrusion electrodes 23 disposed so as to correspond with the slits 5a shown in FIG. 5A, the first step and the second step can be performed at the same time, and the third step and fourth step can be performed at the same time.

Figure 5B:
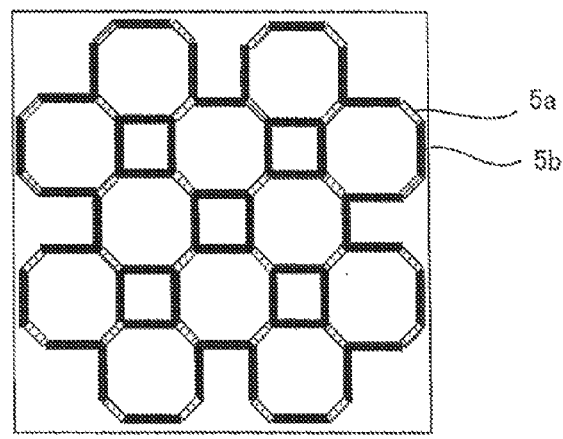
FIG. 5B is a schematic view for explaining a step of the electro-discharge machining by a comb-like electrode in another embodiment, following the FIG. 5A.

Further, by allowing the second comb-like electrode 21 to have the protrusion electrodes 23 disposed so as to correspond with the slits 5a shown in FIG. 5B, the fifth step and the sixth step can be performed at the same time. In the case of using such two kinds of electrodes, the number of electrodes to be prepared can be small, and time and costs for manufacturing the electrodes can be reduced. In addition, since change of the electrodes is required only twice, the number of setup steps such as positioning can be reduced. Further, since the number of sides to be machined at once is large, it needs much time for forming comb teeth of the comb-like electrode 21 in comparison with the case of FIG. 4. However, time for the electro-discharge machining for the slits can be reduced.

In addition, the first to sixth steps may be performed with different six comb-like electrodes. By thus using six electrodes, the variance in slit machining accuracy due to wastage can be reduced to a large extent because the electrodes are changed for every machining. In addition, machining can be performed for any cell shape. Further, it is also possible to prepare three kinds of comb-like electrodes for coarse machining, half-finishing machining, and finishing machining and perform three time machining in each of the steps, thereby machining efficiently and accurately.

Figure 6A:
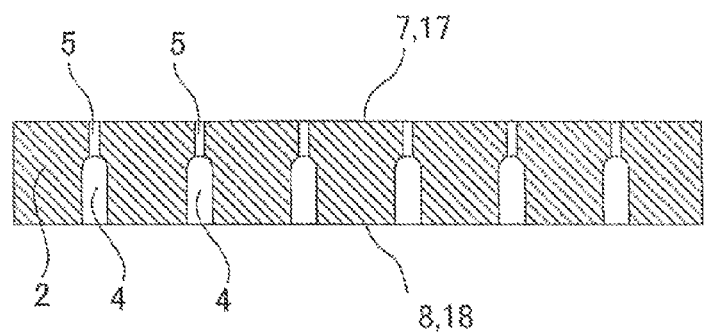
FIG. 6A is a cross-sectional view of a die manufactured by a method for manufacturing a honeycomb structure forming die of the present invention.
Figure 6B:
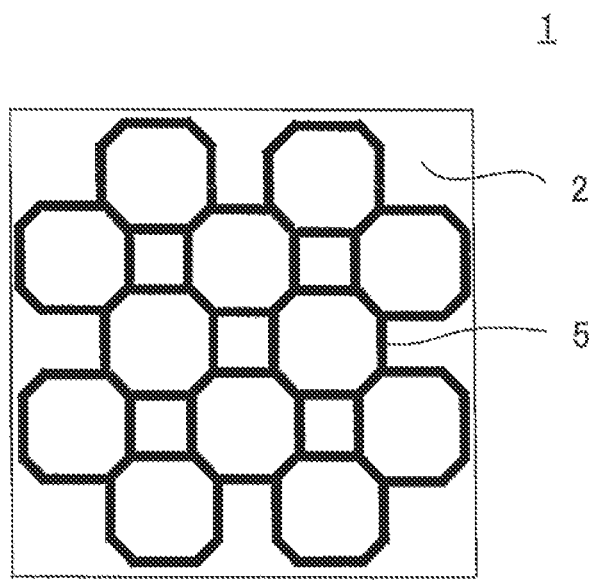
FIG. 6B is a schematic view of a die manufactured by a method for manufacturing a honeycomb structure forming die of the present invention, viewed from one end face side.
Figure 7:
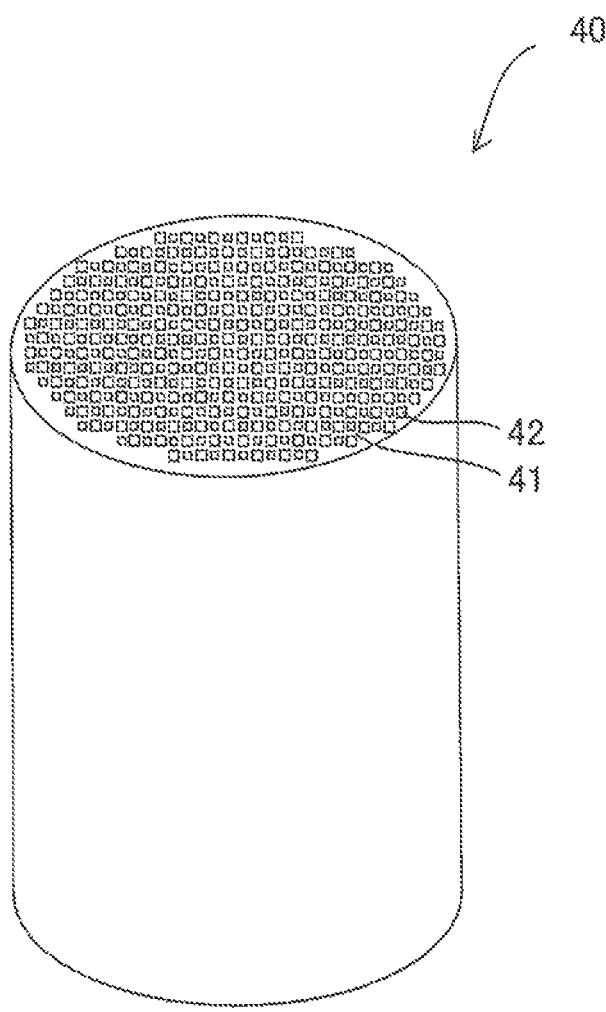
FIG. 7 is a perspective view showing an embodiment of a honeycomb structure manufactured by a die produced by a method for manufacturing a honeycomb structure forming die of the present invention.

FIG. 6A shows a cross-sectional view of the honeycomb structure forming die 1 which can be manufactured by the aforementioned steps, and FIG. 6B shows a schematic view of the die 1 viewed from the one side end face 7 (kneaded clay formation face 17). By extrusion-forming kneaded clay by the use of the die 1, a honeycomb structure as shown in FIG. 7 can be manufactured.

EXAMPLE

Hereinbelow, the present invention will be described in more detail on the basis of Examples. However, the present invention is by no means limited to these Examples.

EXAMPLE

In the introduction hole forming step, about 30 thousands of introduction holes 4 having an opening diameter of 1.70 mm was formed in the range of a diameter of 390 mm of the other side end face 8 of the stainless steel plate-shaped die substrate 2 having vertical and horizontal sizes of 440×440 mm and a thickness of 50 mm as shown in FIGS. 2A to 2C in positions corresponding with vertexes of the cells 42 of the honeycomb structure 40 to be obtained by extrusion forming up to the depth of 47.0 mm from the kneaded clay introduction face 18.

Next, as shown in FIG. 3A, the processing liquid holes 3 were formed in positions corresponding with the introduction holes 4 on the one side end face 7 side where slits 5 were to be formed.

Next, as shown in FIG. 3B, comb-like electro-discharge machining was performed. Specifically, the plate-shaped protrusion electrodes 23 provided on the comb-like electrode 21 had a thickness t of 0.08 mm, a height H of 4.50 mm, and a width L of 0.70 mm in a direction parallel to the protrusion electrodes 23 and were disposed as shown in FIGS. 4A, 4E, and the like.

With discharging processing liquid 10 to the one side end face 7 side via the introduction holes 4 from the other side end face 8 of the die substrate 2, comb-like electro-discharge machining was performed by the use of a comb-like electrode 21 as shown in FIGS. 4A to 4F.

COMPARATIVE EXAMPLE

An electrode having a mesh shape which is like a transcription of a cell structure of the slits 5 was manufactured by subjecting a CuW alloy material to drilling or wire electro-discharge machining.

(Results)

Machining of the slits was performed six times one side by one side in Example, while all the sides were machined at once in the mesh-shaped electrode of Comparative Example. The time for only the electro-discharge machining of the die slits was almost the same between the electrode in Example and the electrode in Comparative Example.

However, when the time required for manufacturing the electrodes was compared, the time required for preparing the electrode per one die 1 in the mesh-shaped electrode of Comparative Example was about eight times that of the comb-like electrode of Example.

In the case of Example, since the machining range was wide, the die 1 was divided into four regions to perform machining. In addition, machining was performed six times one side by one side by different comb-like electrodes. Further, three times of machining of coarse machining, half-finishing machining, and finishing machining were performed with different comb-like electrodes. Therefore, the number of necessary electrodes was 72 (6 times×3 times×4 regions). In the case of the mesh-shaped electrode, since machining was performed with dividing the machining range into four regions, the number of necessary electrodes was four (1 time×4 regions).

The time required for preparing the electrodes in the case of Example was 12 hours for each comb-like electrode and 1700 hours for each mesh-shaped electrode. The time required for preparing the electrodes for one die 1 was 864 hours (12 hours×72) in the case of the comb-like electrode and 6800 hours (1700 hours×4) in the case of the mesh-shaped electrode.

Since nearly one year is required for preparing the mesh-shaped electrode for one die 1, it is distant. On the other hand, though 12 hours are required for preparing one comb-like electrode, the time until the use of one electrode is finished is about 16 hours on an average though the time is different among the coarse machining, the half-finishing machining, and the finishing machining, and therefore, while an electrode is used, another electrode to be used subsequently can be prepared. Therefore, it is not necessary to consider the time for preparing the electrodes when the time required for slit machining is calculated, and the time for the electro-discharge machining of the die slits was about 1150 hours (16 hours×3 times (coarse to finishing)×6 times×4 regions). Therefore, the time for machining a die is almost the same between the case of the comb-like electrode and the case of the mesh-shaped electrode. However, the comb-like electrode needs less time for preparation, and therefore, when the time required for preparation of the electrodes is added to the time for machining a die, time can be reduced to a large extent in the case of comb-like electrode. In addition, the change in slit machining with the passage of time due to wastage of the electrodes can be reduced to a large extent.

The method can be used as a method for manufacturing a honeycomb structure forming die for extrusion-forming a honeycomb structure having cells having different sizes.

What is claimed is:

1. A method for manufacturing a honeycomb structure forming die for subjecting kneaded clay as a raw material to extrusion forming in order to manufacture a honeycomb structure provided with porous partition walls separating and forming a plurality of cells functioning as fluid passages and having first cells having a predetermined opening area and second cells having a different opening area from that of the first cells disposed alternately, wherein the method comprises:

an introduction hole forming step for forming, in a plate-shaped die substrate having one side end face and another side end face, a plurality of introduction holes for introducing kneaded clay on the another side end face to function as a kneaded clay introduction face, and a slit forming step for forming slits in the one side end face of the die substrate to communicate with the introduction holes in order to form the partition walls of the honeycomb structure by extruding the kneaded clay, by performing comb-like electro-discharge machining with a comb-like electrode having a support plate and a plurality of plate-shaped protrusion electrodes extending from the support plate and corresponding to a width of the slits, wherein during the slit forming step the protrusion electrodes of a first comb-like electrode are used to form portions of a first geometric slit pattern in the one side end face of the die substrate, and the protrusion electrodes of a second, different comb-like electrode are used to form portions of a second geometric slit pattern in the one side end face of the die substrate, and wherein the first geometric slit pattern formed by the first comb-like electrode is in a different position on the one end face of the die substrate from the second geometric slit pattern formed by the second comb-like electrode, and the second geometric slit pattern formed by the second comb-like electrode connects parts of the first geometric slit pattern formed by the first comb-like electrode.

2. The method for manufacturing a honeycomb structure forming die according to claim 1, which has a liquid hole forming step for forming processing liquid holes having an opening diameter smaller than the width of the slits in positions where the slits are formed so that the introduction holes communicate with the one side end face before or after the introduction hole forming step, and where the slit forming step is performed with allowing the processing liquid to circulate in the processing liquid holes after the introduction hole forming step and the liquid hole forming step.

3. The method for manufacturing a honeycomb structure forming die according to claim 1, wherein, after predetermined portions of at least one of the first and second geometric slit patterns is formed by at least one of the first comb-like electrode and the second comb-like electrode, at least one of the first comb-like electrode and the second comb-like electrode is rotated to form other portions of at least one of the first and second geometric slit patterns.

4. The method for manufacturing a honeycomb structure forming die according to claim 2, wherein, after predetermined portions of at least one of the first and second geometric slit patterns is formed by at least one of the first comb-like electrode and the second comb-like electrode, at least one of the first comb-like electrode and the second comb-like electrode is rotated to form other portions of at least one of the first and second geometric slit portions.

5. The method for manufacturing a honeycomb structure forming die according to claim 1, wherein the first and second geometric slit patterns have different shapes to form first and second cells of different shapes in the honeycomb structure.

* * * * *